United States Patent [19]
Faulstick et al.

[11] Patent Number: 5,447,234
[45] Date of Patent: Sep. 5, 1995

[54] RECYCLABLE/REUSABLE CONTAINERS FOR PACKAGING GRAPHICAL SHEET MATERIALS

[75] Inventors: Luke T. Faulstick, Webster; Keith D. Myers, Holley, both of N.Y.

[73] Assignee: Eastman Kodak Company, Rochester, N.Y.

[21] Appl. No.: 976,066

[22] Filed: Nov. 13, 1992

[51] Int. Cl.⁶ .................... B65D 85/30; B65D 6/04
[52] U.S. Cl. .................... 206/455; 206/449; 206/565; 211/50; 220/533
[58] Field of Search ................ 206/449–456, 206/215, 564, 565, 567; 220/532, 533, 623, 669–671, 675; 211/50; D7/560, 561, 566, 550–552, 554; 229/2.5 R

[56] References Cited

U.S. PATENT DOCUMENTS

| | | | |
|---|---|---|---|
| D.Re. 23,573 | 11/1952 | Gruen | D7/550 |
| D. 250,402 | 11/1978 | Connell et al. | D7/550 X |
| 423,059 | 3/1890 | Lear . | |
| 2,539,809 | 1/1951 | Buckley . | |
| 2,621,807 | 12/1952 | Rendich | 211/50 X |
| 2,960,219 | 11/1960 | Bielan | 206/215 |
| 3,396,840 | 8/1968 | Farren . | |
| 3,563,445 | 2/1971 | Clayton | 229/2.5 R |
| 3,583,623 | 6/1971 | Golner et al. | 229/2.5 R |
| 3,901,406 | 8/1975 | Kivett | 220/675 X |
| 3,987,829 | 10/1976 | Leone | 220/675 X |
| 4,138,015 | 2/1979 | Rabley | 206/561 |
| 4,207,979 | 6/1980 | Brown | 206/456 |
| 4,234,089 | 11/1980 | Morris | 206/456 |
| 4,241,921 | 12/1980 | Miller | 220/532 X |
| 4,261,465 | 4/1981 | Thomas . | |
| 4,366,904 | 1/1983 | Roskvist | 206/561 X |
| 4,373,636 | 2/1983 | Hoffman | 229/2.5 R X |
| 4,407,411 | 10/1983 | Lowry . | |
| 4,545,486 | 10/1985 | Bostic | 206/455 |
| 4,593,816 | 6/1986 | Langenbeck | 206/564 X |
| 4,778,048 | 10/1988 | Kaspar et al. | 206/449 X |
| 4,778,056 | 10/1988 | Faulstick et al. | 206/449 X |
| 4,798,305 | 1/1989 | Laverty . | |
| 4,951,821 | 8/1990 | Kempkes . | |
| 4,984,688 | 1/1991 | Mikulin | 206/455 |
| 5,016,752 | 5/1991 | Haugen, Jr. . | |
| 5,042,662 | 8/1991 | Mirlieb et al. . | |

FOREIGN PATENT DOCUMENTS

| | | | |
|---|---|---|---|
| 403470 | 9/1924 | Germany | 211/50 |
| 2059920 | 4/1981 | United Kingdom | 229/2.5 R |

*Primary Examiner*—Bryon P. Gehman
*Attorney, Agent, or Firm*—Alfred P. Lorenzo

[57] ABSTRACT

Photographic film, paper, etc. in sheet form is packaged in recyclable containers or cases for reuse by returning to suppliers for filling. Containers obviate disposal problems and high costs associated with customary two-part set-up box and interior padding. Plastic cases comprise a base section in the form of a tray-like structure with an open bed for a film stack, etc. Case has built-in structural features for rigidity, crush resistance, impact protection, and air, dust and light tight seal when used with a cover section. Such environmentally friendly designs are suitable as low cost, reusable one-size plastic containers for packaging standard size sheet products. For packaging special, less frequently called-for size films, papers, etc., interiors may be made infinitely adjustable with rows of parallel channels for placement of at least one chocking element.

21 Claims, 7 Drawing Sheets

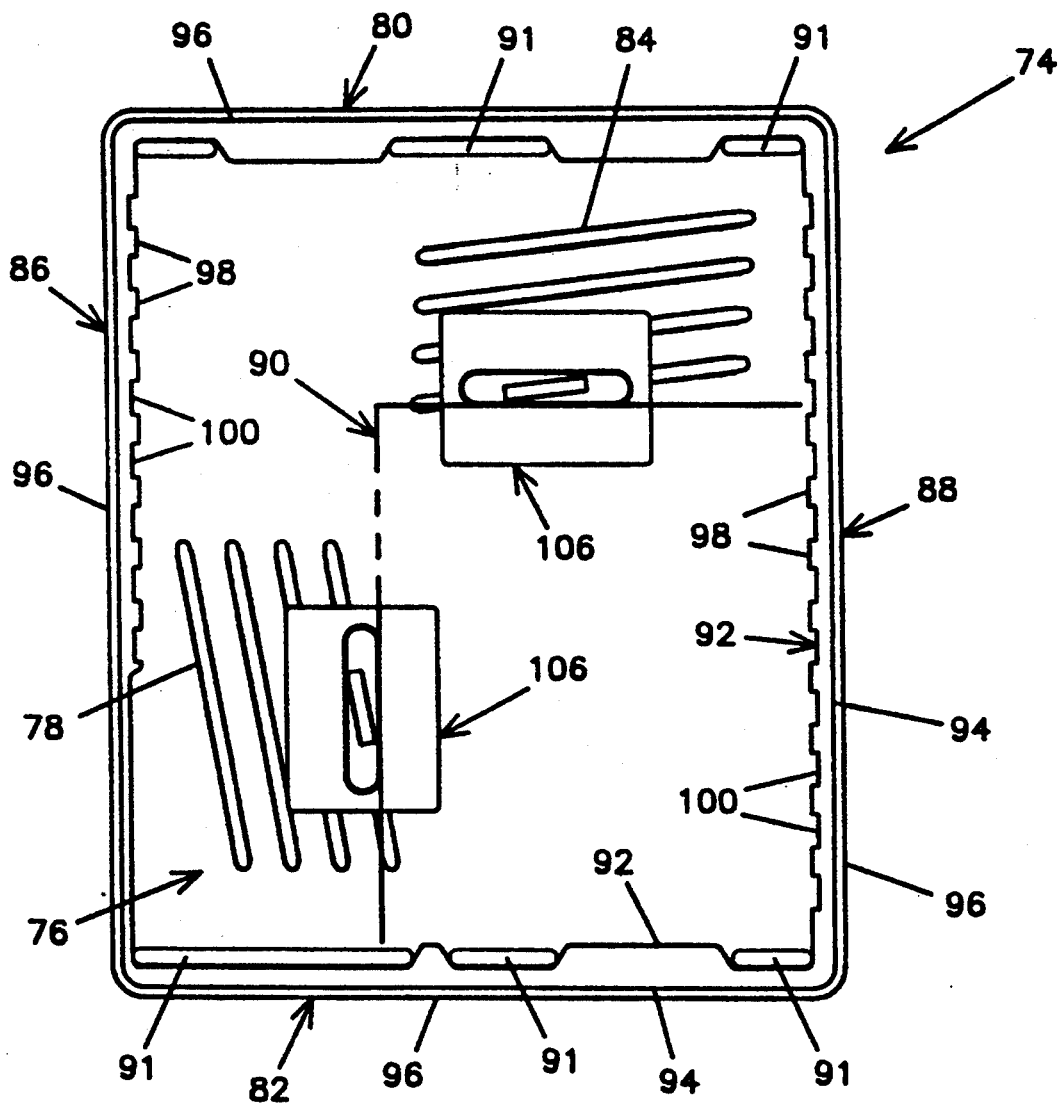
Fig. 7.
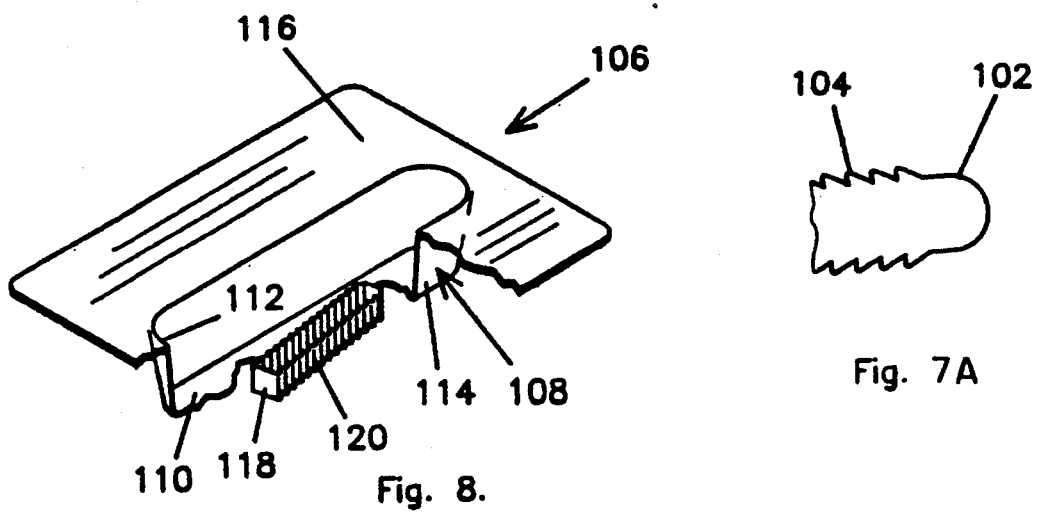
Fig. 8.
Fig. 7A

RECYCLABLE/REUSABLE CONTAINERS FOR PACKAGING GRAPHICAL SHEET MATERIALS

TECHNICAL FIELD

The present invention relates generally to packaging for graphical materials, and more particularly, to environmentally friendly containers for packaging single size photographic film, paper, etc., in sheet form as well as containers with adjustable interiors for packaging special, less frequently called-for sheet sizes.

BACKGROUND OF THE INVENTION

Bags, set-up boxes, cases, and in some instances tubular sleeves have been used for convenient storage, handling and shipping of sheet film, such as radiographic elements; photographic paper, photographic plates, etc. To prevent such sheet products from shifting in their containers during handling and for purposes of preventing damage during storage and shipping specially designed containers with inserts and padding have been developed. For example, U.S. Pat. No. 423,059 discloses packaging for multiple photographic plates in rectangular paperboard containers fitted with interior vertical partitions between container sidewalls and the plates. U.S. Pat. No. 4,951,821 discloses protective packaging corners for retaining photographic prints positioned on flat support backings.

One principal shortcoming of earlier methods and materials used in packaging photographic and graphic art sheets has been the very extensive range of container sizes and inserts required as a result of an almost infinite number of commercially available sheet sizes. Consequently, manufacturers of film sheets, photographic papers and graphic art supplies have been required to maintain large and costly inventories of special packaging materials. The alternative meant acquiring expensive on-demand manufacturing equipment for cutting stuffer pads or forming special parts. In addition, because most of such materials were designed to be discarded by customers after the packaged products were used they created environmental problems, and added to customer costs for disposal.

More recently, U.S. Pat. No. 5,016,752 (Haugen, Jr.) disclosed a plastic storage container with an interior which could be adjusted for packaging photographic prints and negatives of different sizes. The container is equipped with L-shaped corner guides molded as part of the container base which guides are indented inwardly from the side walls to receive photographic prints, such as 3½×5 inches. The dimensions of the container interior can be altered for larger photographs by bending the corner guides to break them off permanently at the base. While the methods of Haugen, Jr. reduced somewhat the number of different size containers needed in packaging photographic prints and negatives the concept of breaking off corner guides for altering the dimensions of the interior mitigated against recycling this type of packaging by returning to film processors for reuse.

A further example of plastic containers having adjustable interiors is disclosed by U.S. Pat. No. 5,042,662 (Mirlieb et al). The containers consist of supply magazines for X-ray film used with a device for automatically loading the film sheets into a cassette. The supply magazine consists of a generic size container which can be adapted to receive radiographic elements in several formats, i.e. predefined sizes and shapes, such as 18×24 cm., 35×35 cm., 18×43 cm., 20×40 cm., etc. Dimensions of the interior may be modified to fit any of these particular film sizes by means of plug-in bars inserted into recesses or holes located in the base and cover sections of the magazine which are predesigned specifically for these film sizes.

While the adjustable containers of Mirlieb et al may be capable of reducing the inventory of multiple magazine sizes for packaging X-ray film their system is not entirely satisfactory. According to the disclosure each sheet format, i.e. film size and shape, is associated with a plurality of oppositely positioned recesses in the bottom and cover sections of the container, into which size projections on plug-in bars can be placed. When the projections are placed into the specific recesses 1c associated with a particular film size or format being packaged the bars define the space required for the sheet. Accordingly, the adjustability of the magazine interiors of Mirlieb et al is quite limited as a result of the required precise prepositioning of recesses for plug-in elements for packaging specific film sizes, and therefore, is lacking in universality. That is, this earlier packaging concept is unable to accommodate virtually any product size placed into the magazine, and particularly, is unable to be used for packaging special product sizes.

The X-ray film magazines of Mirlieb et al may be refillable, but the cover and bottom portions are fastened together. The lack of draft in the magazine side walls also restricts efficient, compact storage and convenient handling and shipping of such containers by customers and film manufacturers for recycling/reuse.

Accordingly, there is a need for more standardized, economic containers and interior packaging elements for graphical sheet products for more substantial reductions in packaging material inventories, including less labor intensive packaging means for special product sizes. As a primary feature, there is need for packaging which is recyclable, possessing structural features which will make it more convenient for customer handling and encourage their returning empty containers to suppliers for refilling. Such environmentally friendly designs should be suitable for building into low cost, reusable plastic, one size containers for packaging standard size graphical sheet products. Similarly, for the almost infinite number of less common and special sizes there is a need for more economic and reusable containers possessing structural features for almost infinite adjustability for packaging X-ray film sheets, photographic prints, negatives, and all other types of photographic elements, papers, plates and graphic art sheets.

SUMMARY OF THE INVENTION

It is therefore, a principal object of the invention to provide for improved, low cost, environmentally friendly packaging containers for graphical sheet materials. For purposes of this invention terms like "graphic" or "graphical sheet" are intended to be generic, denoting any film, such as X-ray film or any other photographic element having a flattened generally rectangular configuration that is thin relative to its length and breadth. The above expressions are also inclusive, for example, of photographic papers, photographic prints and negatives, photographic plates and graphic art materials in sheet form, such as photolithographic plates and papers, to name but a few. The term "rectangular" as used herein is intended to have its ordinarily understood meaning, namely a parallelogram all of whose angles are right angles. It will be understood this is inclusive of one adjacent sides of unequal length, as well as square shapes having four equal sides.

One embodiment of the invention consists of a container for packaging graphical sheets, and is particularly useful for special or less frequently called-for sizes. It comprises in most instances a generally rectangular shaped enclosure having a base section in the form of a tray-like structure and a cover section therefor. The tray or base section comprises a bottom wall and opposing side walls extending upwardly from the peripheral edge of the bottom wall to provide an open bed for a stack of the graphical sheets. The bottom wall of the tray contains a plurality of adjacent channels for holding at least one chocking element for engaging with an edge of the sheets stacked in the tray and for holding against the tray walls to prevent movement and damage during shipping and handling. The channels are arranged in an ordered pattern for maximizing adjustability of the chocking element.

It is yet a further principal object of the invention to provide for containers with adjustable interiors in which the adjacent channels for holding the chocking elements in the bottom wall are advantageously arranged in a graduated or stepwise pattern, and more preferably so they are also parallel. In addition, by arranging adjacent channels so they are in close proximity with one another, and also run diagonally to the side walls it is now possible for the first time to provide a more universal container with almost infinite adjustability for packaging a virtually endless range of sheet sizes.

It is therefore a further object of the invention to provide for adjustable containers for packaging an extensive range of graphical sheet types and sizes wherein only one or two chocking elements are needed for engaging and holding a stack of sheets in preventing movement and damage. Advantageously, this is achieved with container channels arranged in a pattern which permits packaging sheets of various dimensions in the same container tray without requiring specific premeasured locations for affixing chocking elements.

It is yet a further object of the invention to provide for adjustable containers as hereinabove described for graphical sheets which are also recyclable/reusable, and therefore, more friendly to the environment. The containers possess structural features which will encourage customer returning empty containers to suppliers for refilling. In this regard, the containers are preferably independent two-piece construction, a base section in the form of a tray, as previously described along with an independent cover section. The base section comprises a continuous inner and outer side wall, preferably a return flange type tray with a draft or taper in the side wall which enables convenient stacking and nesting together of individual trays for consolidation of several empty containers. This assures maximum efficiency in the utilization of storage space for both customer and supplier while minimizing bulk size for more convenient handling and shipping of several empty trays simultaneously to suppliers for refilling. The tapered, continuous double side walls also allow for higher density packing of the trays with sheet products, and added cushioning for improved impact protection of packaged graphical sheets.

The cover section consists of a top wall and opposing side walls extending from the peripheral edge of the top wall wherein the side walls correspond substantially with the geometry of the return flange configuration of the bottom tray so as to provide an air, dust and light tight seal for the environmentally sensitive graphical sheets packaged therein. This also assures maximum shelf life expectancy of the packaged photographic films, papers and plates.

To further enhance the useful life, and reusability of the graphical sheet containers of the present invention the side wall sections are preferably reinforced. This can be conveniently achieved, for example, by molding multiple ridges and recesses into the side walls. With the cover section in place the alternating ridges and recesses provide columns of strength, and impart added rigidity and durability to the containers; all of which contribute to the useful life expectancy, reusability and economic attractiveness of the containers.

Other embodiments of the invention include related environmentally friendly, economical containers with similar built-in structural features favoring reuse/recycling, but specially modified for packaging standard or more frequently called-for graphical sheet sizes. This graphical sheet container comprises a generally rectangular shaped enclosure having a one-piece base section and a one-piece cover section therefor. The base section comprises a bottom wall, continuous inner and outer opposing side walls extending from the peripheral edge of the bottom wall to provide a tray-like structure having an open bed for a stack of graphical sheets. The tray preferably includes recessed corners for protecting the stack from impact damage and a plurality of side wall reinforcements, e.g. recesses and ridges for enhancing the strength, rigidity and useful life expectancy of the container. The cover section comprises a top wall and opposing side walls adjoined at corners and extending downwardly from the peripheral edge of the top wall to engage with the base section. The configuration of the side walls and corners of the cover section correspond substantially with the side walls and corners of the base section to form an air, dust and light tight seal. This embodiment may also include a terminal flange extension from the outer side walls of the base and cover sections. The side walls of the base and cover sections are preferably tapered to permit nesting and consolidation of several empty sections for more efficient use of storage space and compactness for easier handling and shipping for recycling/reuse.

BRIEF DESCRIPTION OF THE DRAWINGS

For a further understanding of the invention, as well as its characterizing features reference should now be made to the accompanying drawings wherein:

FIG. 7 is a top plan view of a lower tray section of an alternative embodiment of an adjustable container with multiple chocking elements and graphical sheet shown with broken lines;

FIG. 7A is an enlarged cut-away portion of the inside wall of a channel for holding chocking elements in the bottom wall of the tray of FIG. 7;

FIG. 8 is an isometric view of the chocking element shown in combination with the lower tray section of FIG. 7, but with a section broken away;

FIG. 15A is an enlarged cut-away portion of the tray of FIG. 15 showing graphical sheets engaging with tray side walls;

FIG. 16A is an enlarged cut-away view of FIG. 16 showing legs of trays in stacked arrangement.

DESCRIPTION OF THE PREFERRED EMBODIMENTS

Figure 1:
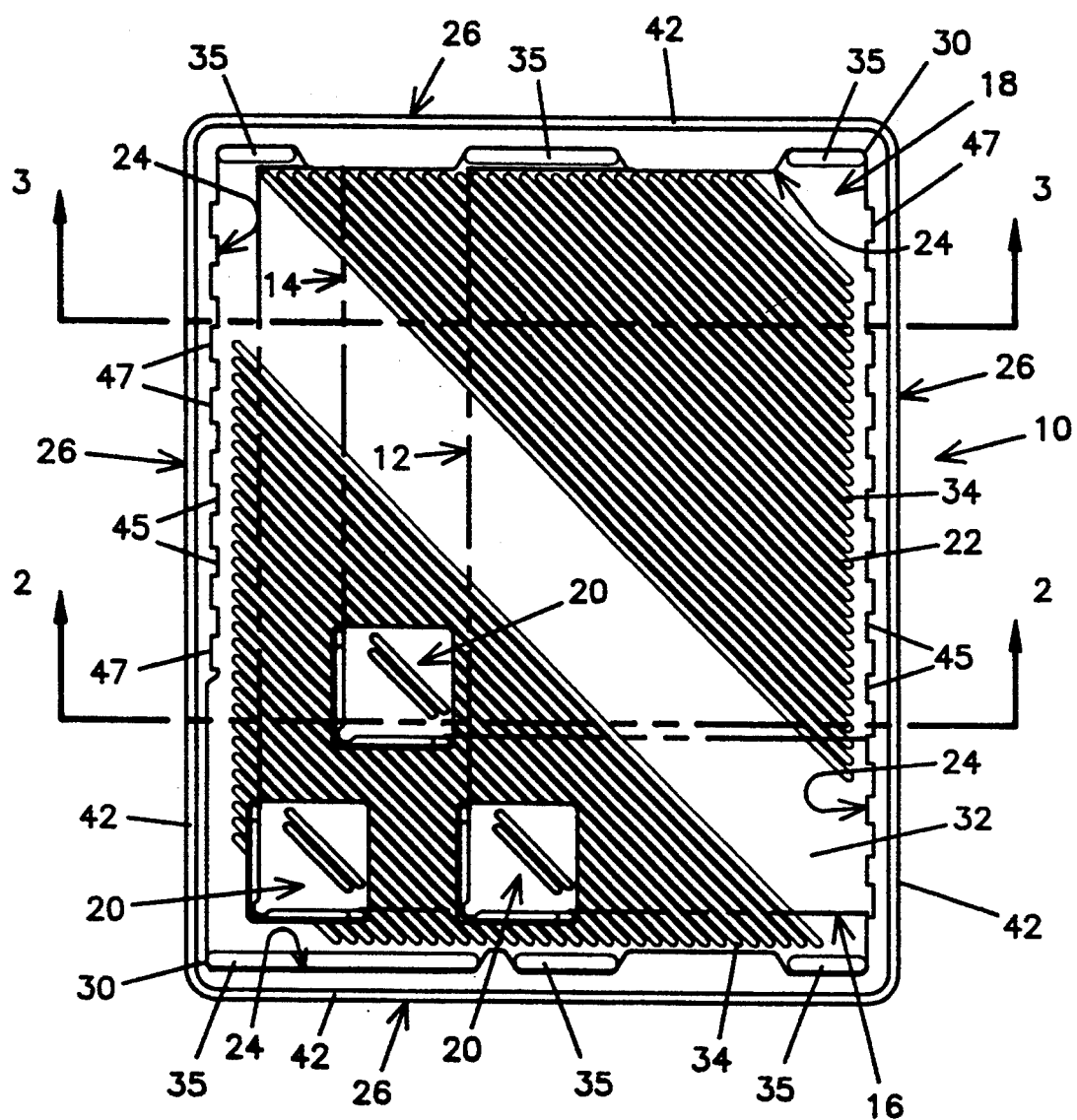
FIG. 1 is a top plan view of the lower tray section of an adjustable container of the invention, including chocking elements with graphical sheets shown with broken lines.

Turning first to FIG. 1, there is shown bottom tray 10 of a first embodiment of an adjustable container for packaging graphical sheets of different dimensions, and particularly special and less frequently requested sheet sizes. For purposes of illustration, FIG. 1 is shown with broken shadow lines to depict multiple sizes of graphical sheets 12, 14, 16 packaged in bed 18 of tray 10. However, it should be understood that the adjustable containers of the invention are intended primarily for packaging sheets of the same dimensions. Though less preferred, different size sheets may be packaged in mutually exclusive stacks in the same tray bed provided the stacks do not overlap with one another at chocking elements 20.

Bed 18 of tray 10 may be any convenient size, e.g. 51×61 cm.; 56×71 cm., 25×30 cm., etc. Thus, tray 10 having a bed size of, for example, 51×61 cm. may be used for packaging a stack of sheets of the same dimensions without a chocking element 20. Under such circumstances, the stack of sheets will fill the entire tray bed 18. The four edges of the stack of sheets (not shown) will make flush contact with inner walls 24 of side walls 26. When the tray is sealed with a cover section 28 (FIG. 2) the sheets will be protected from shifting and damage without extra padding or special inserts.

Likewise, tray 10 having a bed size of 51×61 cm. may also be used for packaging sheets of virtually any incrementally smaller size either in breadth, length, or both breadth and length by employing one or more chocking elements 20. The chocking elements engage one or more free edges of the sheet stack and hold it firmly against one or more inner walls 24 of the tray to prevent movement and damage to the sheets during handling and shipping. Preferably, the stack is retained against a corner section 30 of tray 10 bridging two adjacent inner walls 24. Less preferably, the sheets may be retained against one inner wall 24 and two or three chocking elements used to firmly hold the stack in a stationary position to prevent shifting.

Tray 10 includes a bottom wall 32 with a plurality of adjacent channels 34. For purposes of this invention the term "channels" as used herein is intended to mean generally elongated narrow grooves or furrows having a U-shaped configuration, when taken sectionally. With the embodiment of FIG. 1, channels 34 are preferably in close proximity to one another and run diagonally between adjacent side walls 26. Therefore, channels positioned toward the central region of the tray become incrementally longer, and conversely become gradually shorter toward tray corners 30. Channels 34 function essentially as tracks for guiding chocking elements 20 to assist in their positioning, retention and adjustment relative to sheets being packaged in the containers. In addition, the arrangement of channels in bottom wall 32 as shown provides virtually infinite adjustability to the chocking elements for fine firm adjustments and flush engagement with a stack of sheets. This can be achieved by moving the chocking element diagonally in one channel in either direction, or to next adjacent channel(s) in either direction for closer fit against a sheet stack, regardless of size.

Figure 3:
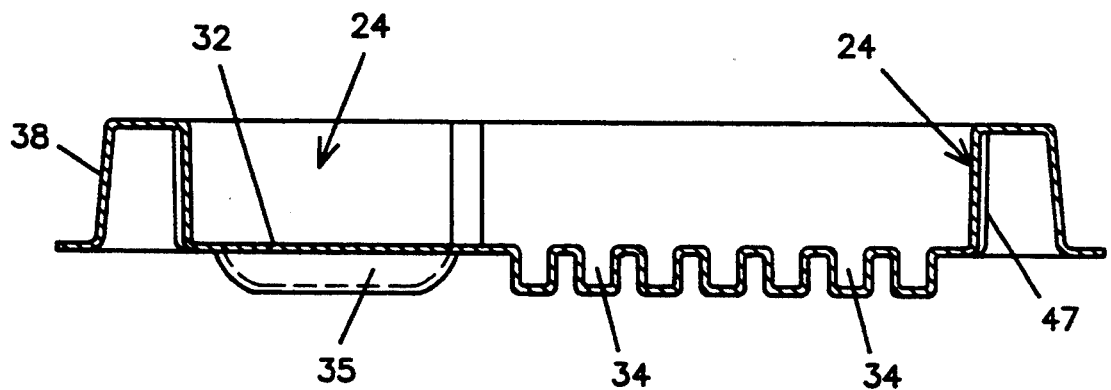
FIG. 3 is a sectional view of the lower tray section taken along line 3—3 of FIG. 1, but with the sheet materials and cover section omitted.

In addition to parallel channels 34, bottom wall 32 may have multiple recesses 35 (FIGS. 1, 3) positioned adjacent to inner walls 24 of side walls 26. Recesses 35 are in the form of elongated hollow slots extending downwardly below the planar surface of bottom wall 32 (FIG. 3), and are indented outwardly in inner walls 24 of side walls 26. Because sheet stacks do not occupy the space directly above indented recesses 35, they provide a convenient access in facilitating removal of sheets or a stack with only finger engagement. Recesses 35 also facilitate loading containers with sheets packaged in protective wrapping (discussed in greater detail below) by providing added space for slackness in the wrapping. Recesses 35 at tray corners 30 also provide the added benefit of crush protection for sheet stacks at potentially vulnerable corners by reducing the occurrence of damage to tray contents during handling.

Figure 2:
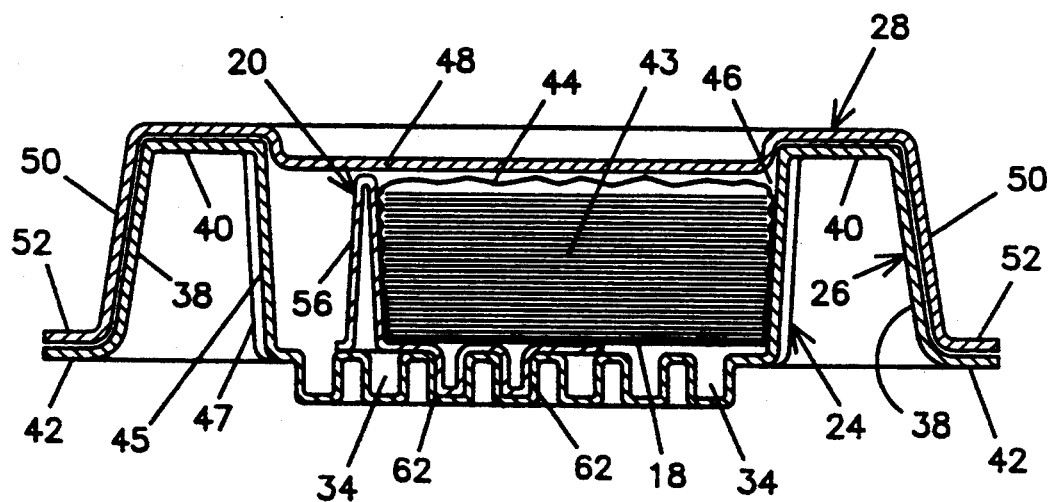
FIG. 2 is a sectional view of the lower tray taken along line 2—2 of FIG. 1, but with the cover section of the tray added.

Side wall 26 is continuous and includes in addition to inner wall 24, an outer wall 38 (FIG. 2) spaced from the inner wall by bridging wall 40. Outer wall 38 preferably has a terminal flange extension 42 as part of continuous side wall 26. In addition, the continuous inner and outer side wall sections 24, 38 are slightly tapered with an outwardly extending draft to the walls providing a so called "fly leg" configuration (FIG. 2). This configuration allows suppliers and customers to consolidate a plurality of empty trays in compact nested stacks for maximizing efficient use of space during storage prior to returning to suppliers for refilling, and also for minimizing bulk size for more convenient handling and shipping.

The outward draft of inner wall 24 also provides the advantage of better sheet packing density. In this regard, photographic films and papers 43 (FIG. 2), for example, may be packaged in sealed, light opaque plastic bags 44. In filling trays with stack filled bags there may be need for a small amount of residual space 46 (FIG. 2) between inner wall 24 and film/paper sheets 43 for loosely gathered film from bag 44. The outward draft of inner wall 24 also facilitates high density packing of bed 18 with sheet materials while still allowing a slit of space for tucking slack film from the plastic bag and provide a flush fit against the walls.

Side walls 26 of tray 10 preferably also include means for reinforcement for enhancing the strength, rigidity and reusable life of the containers. This can be achieved with a plurality of built-in alternating ridges 45 and recesses 47 which provide columns of strength for imparting improved vertical crush resistant properties to the container.

Cover section 28 (FIG. 2) provides a protective air, dust and light tight seal with bottom tray 10. Cover 28 includes an indented top wall 48 which preferably engages an upper edge of chocking element 20 (FIG. 2). Cover 28 also includes a continuous side wall 50 and a terminal flange section 52 which closely follow the configuration of the corresponding sections of lower tray 10. Accordingly, with cover section 28 in place an air, dust and light tight seal is formed with bridging wall 40, outer wall 38 and terminal flange section 42 of the bottom tray.

Figure 4:
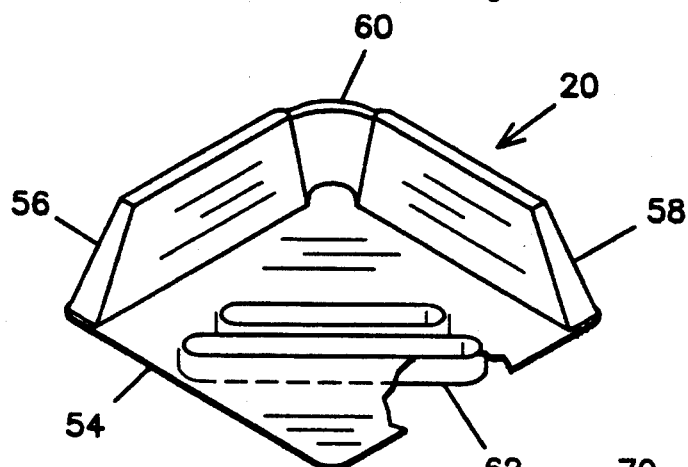
FIG. 4 is an isometric view of the corner style chocking element shown in FIG. 1.

Chocking element 20 as employed in the first embodiment (FIGS. 1-2) engage adjacent corner edges of a graphical sheet stack. Only a single element is required when a stack of sheets is held against adjacent inner walls 24. Corner chocking element 20 consists of a base 54 (FIG. 4), first and second vertical side walls 56, 58 adjoined to the base and connected together through corner 60 which may be outwardly expanded for shielding the corner edge of a stack of sheets stationed against the element from damage. Extending from base 54 are a pair of elongated projections 62 which fit into channels 34 in bed 18 of tray section 10. First and second side walls 56, 58 are of sufficient height to extend vertically from bed 18 and make contact with top wall 48 of cover section 28 (FIG. 2) which assists in retaining the chocking element firmly seated in channels 34. Vertical side walls 56, 58 may also have some draft for optimum fit for a stack of sheets, for facilitating release of the one-piece element from a die during manufacture, and for nesting together several of the same elements for more efficient use of storage space.

Figure 5:
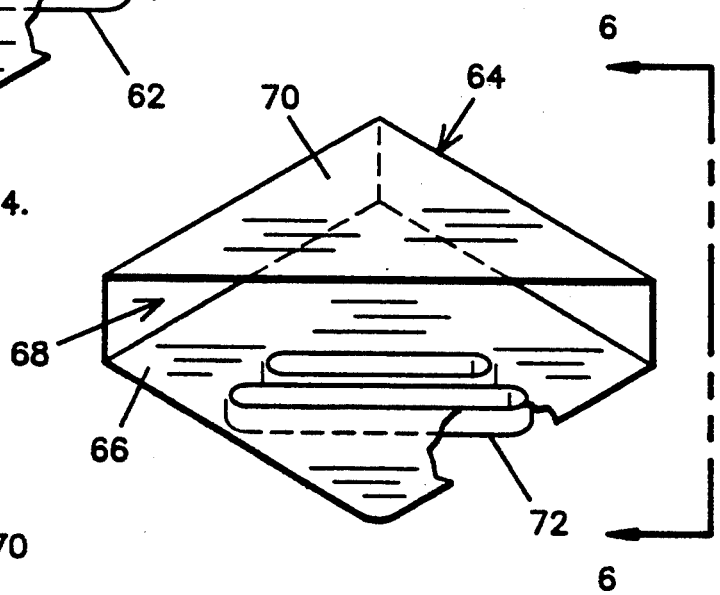
FIG. 5 is an isometric view of an alternative closed type corner chocking element.
Figure 6:
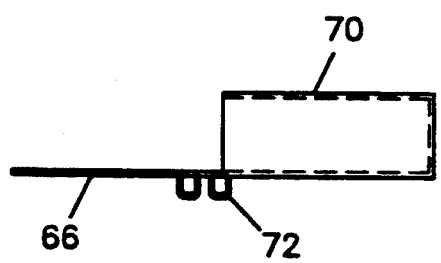
FIG. 6 is a sectional view of the closed corner chocking element taken along line 6—6 of FIG. 5.

FIGS. 5-6 show alternative embodiments of a corner chocking element 64 having a base member 66 and a triangular shaped enclosure 68 consisting of a top wall 70 and elongated projections 72 extending from base 66 for fitting into channels 34. The height of enclosure 68 corresponds to the depth of the case interior measuring from the cover section to the bottom wall of the bed.

FIG. 7 is a further embodiment of the recyclable/reusable graphical sheet containers of the invention shown without a cover section. Bottom tray 74 also has structural features for virtually infinite adjustability of multiple chocking elements for engaging at least two edges of a stack of graphical sheets regardless of size. Tray 74, like that of tray 10, may also be used for packaging stacks of graphical sheets without chocking elements in those instances where sheet dimensions correspond to the size of the tray bed. However, because of the adjustability of the tray interior this embodiment is especially well adapted for special and less frequently requested sheet sizes.

Rectangular bottom tray 74 comprises a bottom wall 76 with a first cluster of elongated channels 78 running lengthwise generally between end walls 80, 82. A second cluster of elongated channels 84 runs breadthwise between side walls 86, 88. The channels of each cluster are parallel with one another and are positioned diagonally to the adjacent edge proximate to sheet stack 90. It is to be understood that the four channels for each cluster 78, 84 are for illustrative purposes only, and that the actual number of channels may be greater or fewer depending on the smallest size sheets to be packaged relative to the dimensions of the container bed. Suffice it to say, there can be several more rows of adjacent channels aligned in close proximity to one another allowing for very fine adjustments in the dimensions of the bed for packaging even special nonstandard sheet sizes.

Bottom tray 74 also preferably includes a plurality of elongated recesses 91 for assisting in the removal of sheet stacks from the container, which recesses were described above in detail in connection with the first embodiment of the invention illustrated in FIG. 1.

The side walls 86, 88 and end walls 80, 82 of bottom tray 74 also have continuous inner and outer wall sections 92, 94 with desired draft and a terminal flange 96 for an air, dust and light tight seal when used with a cover section (not shown). Likewise, the side and end walls preferably have multiple ridges 98 and recesses 100 for enhanced rigidity, strength, crush resistant properties and for increased reusable life expectancy, all previously described in detail in connection with the first embodiment of the invention.

As an optional feature of the invention, channels 78, 84 may be equipped with a mechanism for securing and restricting movement of chocking elements inserted therein. This includes forming on the inside wall 102 (FIG. 7) of the channels locking teeth 104 of a sawtooth design. Two chocking elements 106 (FIG. 8) for application with this embodiment of the invention on the length and breadth sides of a stack of sheets include an elongated well 108 having a bottom wall 110, upper rim 112, side wall 114 for engaging one edge of a sheet stack, and a flange 116 extending from the upper rim as a headpiece for a sheet stack. A projection 118 extends from bottom wall 110 to engage with a channel of clusters 78 and 84 of tray section 74 while meshing with locking teeth 104 on inside wall 102. Projection 118 is positioned at an acute angle relative to side wall 114 in order to maintain the side wall in full contact with the sheet stack (FIG. 7). By engaging projection 118 with locking teeth 104 the chocking elements remain firmly implanted in the elongated channels without slippage.

Figure 9:
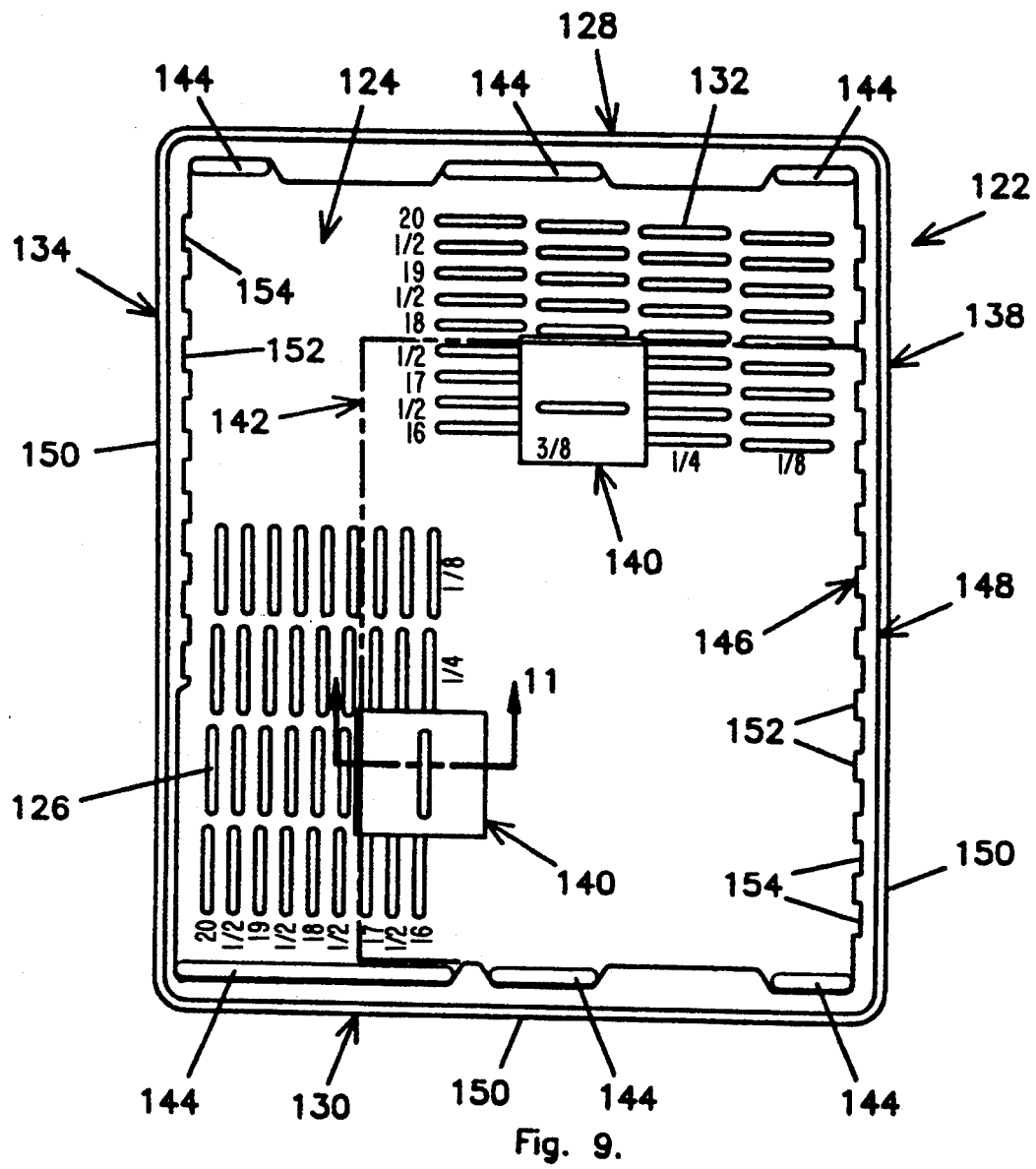
FIG. 9 is a top plan view of a lower tray section of an alternative adjustable container of the invention with dual chocking elements.

FIG. 9 discloses details of a third embodiment of the invention with structural features favoring recycling/reuse, along with virtual infinite adjustability of the interior for packaging graphical sheets of most any size, and particularly special and less frequently used sheet sizes. The container comprises a bottom tray section 122 and a cover section therefor (not shown), having side walls corresponding substantially in design with those of the bottom tray section. This third embodiment may be used in combination with multiple chocking elements for engaging at least two edges of a stack of graphical sheets which are smaller in dimension than tray bed 124.

Bottom tray 122, like that of the first two embodiments of the invention previously discussed, may also be used for packaging stacks of graphical sheets without chocking elements in those instances where the sheet dimensions correspond to those of the tray bed. The generally rectangular shaped tray 122 comprises a bottom wall 124 with a first cluster of vertically positioned independent channels 126 running lengthwise between end walls 128, 130. A second cluster of horizontally positioned channels 132 runs breadthwise between side walls 134, 138. The channels perform as holding means for chocking elements 140 which in turn engage at least two edges of sheet stack 142 for holding it firmly against end wall 130 and side wall 138.

Independent channels 126, 132 are arranged in row patterns for fine adjustments in the stationing of chocking elements 140 for packaging graphical sheets of virtually any size, and particularly for packaging nonstandard, special product sizes. FIG. 9 illustrates, for example, each cluster of channels 126, 132 consisting of four rows. The adjacent parallel channels of each row are in close proximity and evenly spaced from one another. However, each row of channels 126 is positioned a fraction of an inch, e.g. ⅛ inch, closer to side wall 138 than the prior row, and so on. Similarly, each row of channels 132 is positioned a fraction of an inch, e.g. ⅛ inch, closer to end wall 130 than the prior row. It should be understood that each row is shown in FIG. 9 with nine channels. However, this is illustrative only, and can be increased, for instance, to package smaller size sheets in a container. Suffice it to say, there can be several rows of adjacent channels aligned in close proximity to one another allowing for very fine adjustments in the dimensions of the bed for accommodating even special non-standard sheet sizes.

Bottom tray 124 preferably includes a plurality of elongated recesses 144 for assisting in the removal of sheet stacks from the container, which recesses were described above in detail in connection with other embodiments of the invention.

Side walls 134, 138 and end walls 128, 130 of bottom tray 122 also have continuous inner and outer wall sections 146, 148 with desired draft (not shown) and a terminal flange 150 for an air, dust and light tight seal when used with a cover section (not shown). The side walls and end walls preferably have multiple ridges 152 and recesses 154 for enhanced rigidity, strength and crush resistant properties for increased life expectancy, all previously described in detail in connection with the prior embodiments of the invention.

Figure 10:
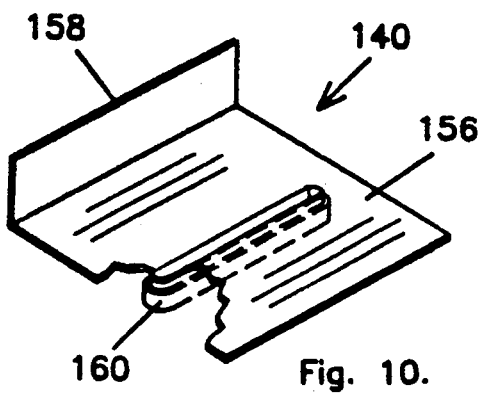
FIG. 10 is an isometric view of the chocking element shown in combination with the lower tray section of FIG. 9, but with a section broken away.
Figure 11:
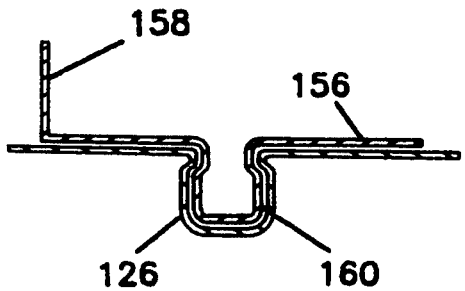
FIG. 11 is a sectional view of the chocking element inserted in place taken along line 11—11 of FIG. 9.

FIGS. 10-11 show in detail the structural features of a representative chocking element 140 which may be used in combination with packaging tray 122. Chocking element 140 consists of a base member 156 and a vertical stack engaging member 158 at the edge of the base member. A projection 160 extending from base member is designed to engage and snap into channels 126, 132.

Figure 12:
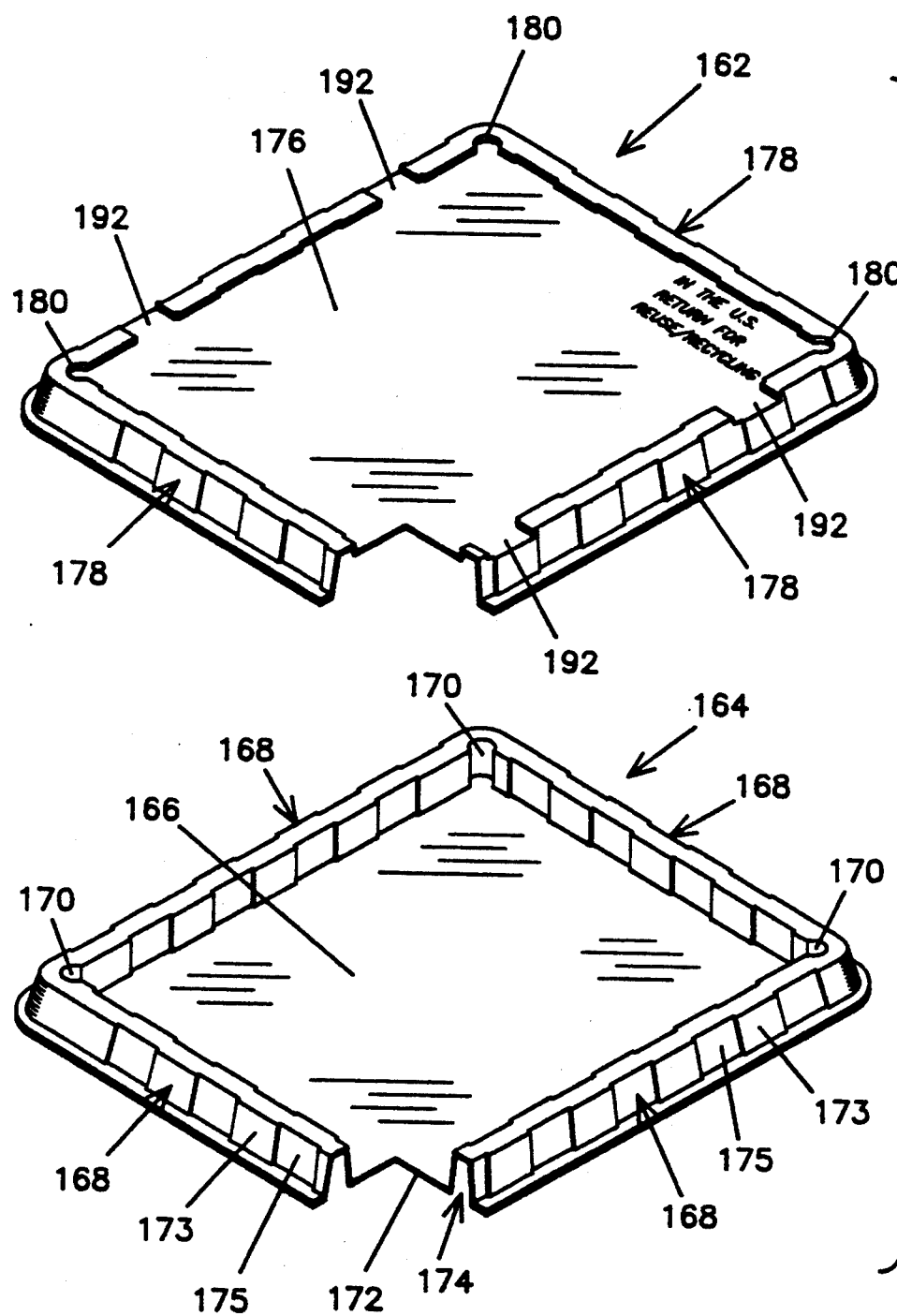
FIG. 12 is an exploded view of a further embodiment of the reusable/recyclable graphical sheet cases of the invention for standard, more frequently called-for sheet sizes with a corner removed.

A further embodiment of the reusable/recyclable graphical sheet containers of the invention is illustrated in FIGS. 12-16. The containers of this fourth embodiment are intended primarily for packaging higher volume standard size graphical sheet products. FIG. 12 discloses a two piece reusable plastic case for packaging, for example, photographic elements such as X-ray film sheets which occupy the entire bed of the case (see FIG. 15). The recyclable graphical sheet case has built-in structural features for rigidity, crush resistance, impact protection, all of which eliminate the need for special inserts or padding while allowing stacking and shipping of multiple filled cases with minimal risk of damage to container contents. The closure mechanism of the two-piece graphical sheet case provides an air, dust and light tight seal to protect container contents and maximize shelf-life of packaged products. In addition, all individual components of the case are nestable for consolidation by users and suppliers into compact stacks for easier handling and more efficient use of storage space prior to refilling.

The two-component plastic case consists of a cover section 162 and a bottom section 164 in the form of a tray. The one-piece molded tray consists of a bottom wall 166 and opposing side walls 168 interconnected at recessed corners 170 for shock absorption from impact and added protection of packaged sheets in the event a corner of a closed case is damaged during handling and shipping. As seen from cut-away portion 172 side walls 168 are continuous, double walled, return flange type with a fly leg design 174. In addition, side walls 168 have built-in alternating ridges 173 and recesses 175 for better rigidity and strength, and resistance to compressive forces.

The one-piece molded cover section 162 comprises a recessed top wall 176 with return flange type side walls 178 and sheet protective recessed corners 180 (FIG. 12), all conforming with side walls 168 of bottom tray section 164. Terminal flange members 177, 179 (FIG. 14) provide an air, dust and light tight seal when cover section 162 is assembled into a case with bottom tray section 164.

Figure 13:
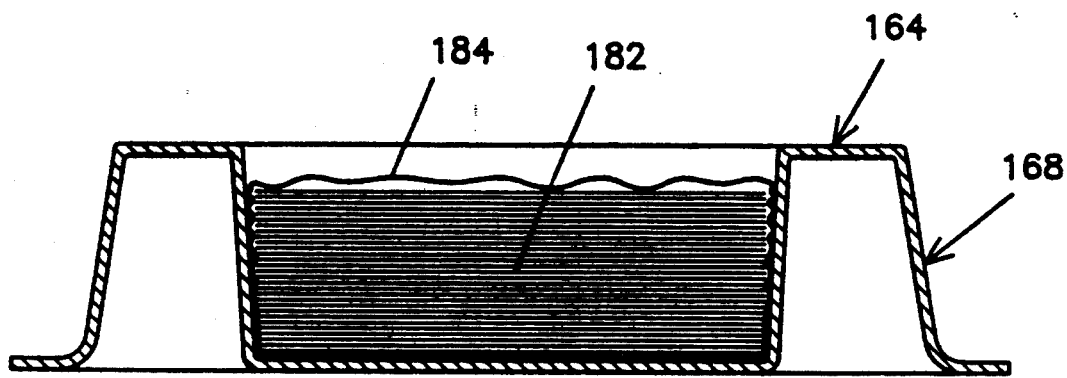
FIG. 13 is an enlarged sectional view of the lower tray section of the embodiment of FIG. 12 shown with a stack of graphical sheets in the bed of the tray.
Figure 14:
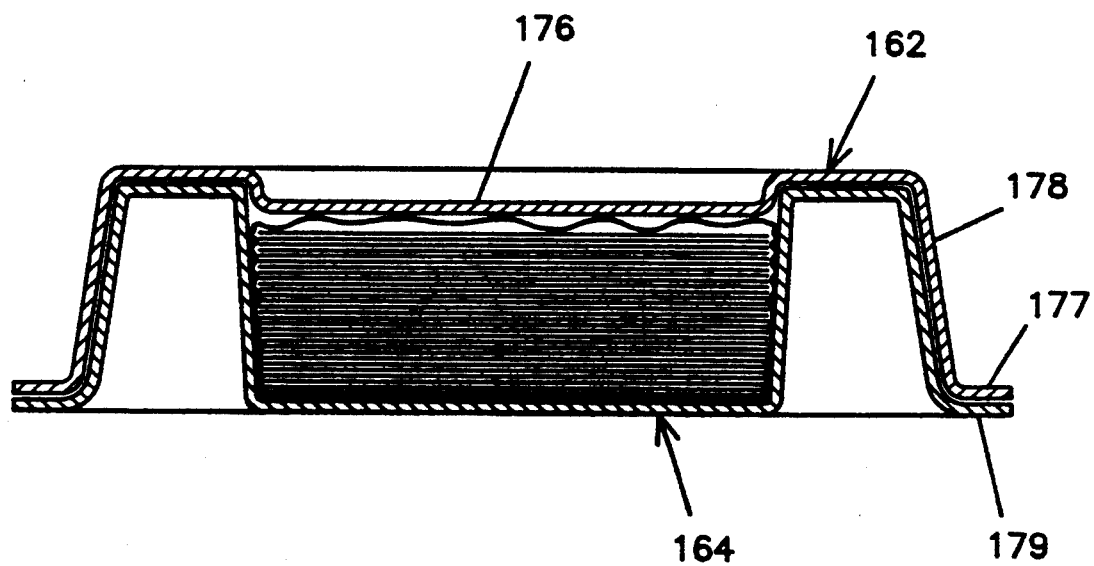
FIG. 14 is view corresponding to that of FIG. 13, but with the cover section of the case in-place.
Figure 15:
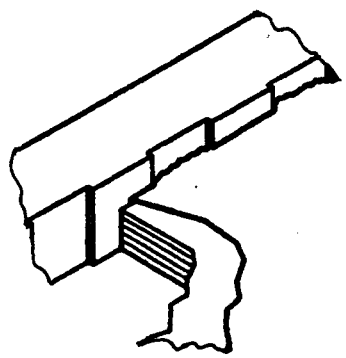
FIG. 15 is an isometric view of the lower tray section of the embodiment of FIG. 12 with a magnified portion showing the edge of sheets stacked therein.
Figure 15:
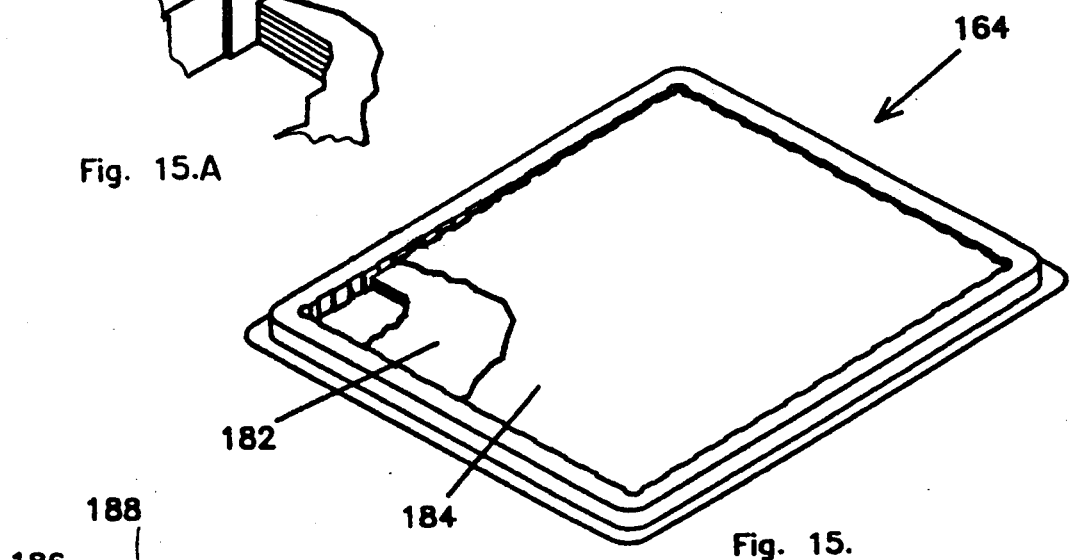

Side walls 168 of tray section 164 and sides walls 178 of cover section 162 are preferably tapered with an outwardly angled draft. This provides a flexing and shock absorbing affect to the tray bed 166 to cushion case contents from impact damage. FIGS. 13-14 provide sectional views of bottom tray 164 with a stack of graphical sheets 182 in a light opaque plastic bag 184. The outward draft of side walls 168 enables denser more compact filling of the tray bed with sheets while providing residual space for tucking loose film from plastic bag 184.

Figure 16:
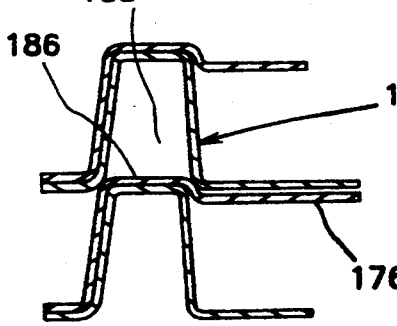
FIG. 16 is an isometric view of multiple filled cases of the embodiment of FIG. 12 strapped to a pallet with a magnified section showing nested recesses in the case walls for stable stacking of filled cases.
Figure 16:
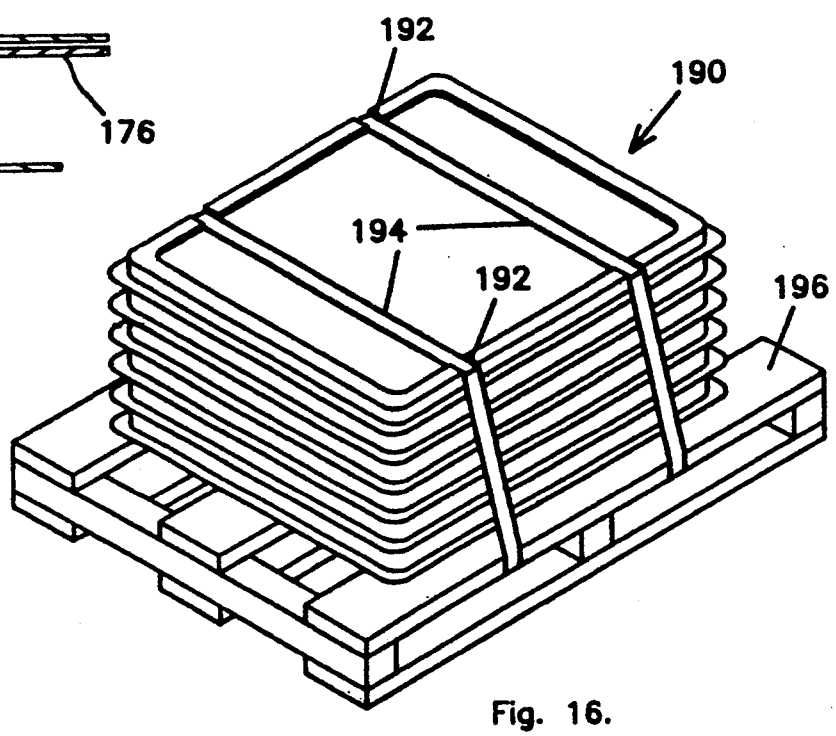

The outward extending draft enables users and suppliers to nest empty trays and covers for more efficient use of storage space and more convenient handling and shipping. Likewise, filled cases can also be nested together for more efficient shipping and storing of multiple packages (FIG. 16). In stacking filled cases, bridging wall 186 (FIG. 16) of top wall 176 of cover section 162 engages with gap 188 of the double side wall of bottom tray section 164. To retain a stack 190 of filled cases in place for storage and shipping cover section 162 may have strapping slots 192 (FIGS. 12, 16). Bands 194 can be employed for strapping closed single filled cases and multiple filled cases to pallet 196 for convenient shipping and handling.

The graphical sheet containers/cases described hereinabove can be fabricated using known materials and methods in the art. They may be fabricated from most any of the commonly available thermoplastics. Preferred representative examples include the polyolefins, such as high density polyethylene, and particularly polypropylene for even better impact resistance. Other useful thermoplastics include polystyrene, polyesters like PET, polyamids such as nylon 6, to name but a few. Molding compositions should be sufficiently inert and not leach into or react with photo-graphic elements, papers, plates, etc. While the invention contemplates containers which are optically translucent, it is preferred that the plastic cases and containers be opaque to light for optimum product stability and shelf life. Container walls range in thickness from about 40 to 70 mils, and more preferably about 60 mils.

As previously indicated, the plastic trays of the invention can be fabricated by conventional, well established methods in the art, e.g. injection molding, and more preferably, thermoforming methods. Injection molding is intended to relate to methods of molding thermoplastic materials in which molten plastic resin is extruded and injected between two molded halves where pressure and cooling solidify the plastic. A further preferred method of fabrication is by conventional thermoforming where a plastic sheet is heated and forced into or over a mold by vacuum, mechanical or air pressure means.

The invention has been described in detail with particular reference to preferred embodiments thereof, but it will be understood that variations and modifications can be effected within the spirit and scope of the invention.

We claim:

1. A container for packaging graphical sheets, which comprises an enclosure having a base section and a cover section therefor, said base section comprising a bottom wall and opposing side walls extending upwardly from the peripheral edge of said bottom wall to provide a tray structure having an open bed for a stack of graphical sheets, said bottom wall having a plurality of parallel adjacent channels arranged in a graduated pattern, and a corner chocking element having surfaces for engaging with adjacent corner edges of graphical sheets stacked in said bed, said chocking element having means for connecting with one of said channels.

2. A container for packaging graphical sheets, which comprises an enclosure having a base section and a cover section therefor, said base section comprising a bottom wall and opposing side walls extending upwardly from the peripheral edge of said bottom wall to provide a tray structure having an open bed for a stack of graphical sheets, said bottom wall having a plurality of adjacent parallel channels running diagonally relative to said side walls and arranged in a graduated pattern, a corner chocking element comprising surfaces for engaging with adjacent corner edges of a sheet stack in said bed, said chocking element having means for connecting with one of said channels, and locking means for securing said element in said channel.

3. The packaging container of claim 2 filled with graphical sheets selected from the group consisting sheet film, photographic paper, photographic print, photographic plates, graphic art plates and graphic art paper.

4. A container for packaging graphical sheets, which comprises an enclosure having a base section and a cover section therefor, said base section comprising a bottom wall and opposing side walls extending upwardly from the peripheral edge of said bottom wall to provide a tray structure having an open bed for a stack of graphical sheets, said bottom wall having a plurality of adjacent parallel channels arranged in a graduated pattern, at least one chocking element for engaging with an edge of a stack of graphical sheets in said bed, each chocking element comprising an elongated well with a bottom wall, an upper rim, a side wall for engaging an edge of said stack of graphical sheets, and a flange extending from said upper rim, said bottom wall including means for connecting said element to one of said channels.

5. A container for packaging graphical sheets, which comprises an enclosure having a base section and a cover section therefor, said base section comprising a bottom wall and opposing side walls extending upwardly from the peripheral edge of said bottom wall to provide a tray structure having an open bed for a stack of graphical sheets, said bottom wall having a plurality of adjacent channels arranged in a graduated pattern, and at least one chocking element for engaging with an edge of sheets stacked in said bed, each chocking element comprising a horizontal base member, a contact member extending vertically from said base member for engaging an edge of said stack of graphical sheets, and means for connecting each element to one of said channels.

6. A recyclable container for packaging graphical sheets, which comprises an enclosure having a one-piece base section and a one-piece cover section therefor, said base section comprising a bottom wall, continuous inner and outer opposing double side walls extending from the peripheral edge of said bottom wall to provide a tray-like structure with an open bed for a stack of graphical sheets, said base section having corner means for protecting a sheet stack from damage, said inner side wall having adjacent ridges and recesses for enhancing the strength and rigidity of said container, said cover section comprising a top wall and opposing side walls adjoined at corners and extending downwardly from the peripheral edge of said top wall, the configuration of said side walls and corners of said cover section corresponding substantially with the side walls and corners of said base section to form an air, dust and light tight seal, the side walls of said base section being tapered sufficiently with outwardly angled draft to provide a flexing and shock absorbing effect to said bed.

7. The graphical sheet packaging container of claim 6 including a terminal flange extension on said outer side wall of said continuous inner and outer opposing side walls of said base section and a corresponding terminal flange extension on said side walls of said cover section for engaging with said flange extension on said base section.

8. The graphical sheet packaging container of claim 7 wherein the side walls of said cover and base sections are tapered to permit nesting together of multiple base sections and multiple cover sections.

9. The graphical sheet packaging container of claim 8 including strapping recesses.

10. The graphical sheets packaging container of claim 8 which is refillable.

11. The packaging container of claim 8 filled with graphical sheets selected from the group consisting sheet film, photographic paper, photographic prints, photographic plates, graphic art plates and graphic art paper.

12. The graphical sheet packaging container of claim 7 fabricated from plastic by a process selected from the group consisting of thermoforming and injection molding.

13. The packaging container of claim 6 filled with graphical sheets.

14. A container for packaging graphical sheets, which comprises an enclosure having a base section and a cover section therefor, said base section comprising a bottom wall and opposing side walls extending upwardly from the peripheral edge of said bottom wall to provide a tray structure having an open bed for a stack of graphical sheets, said bottom wall having a plurality of adjacent channels for holding at least one chocking element for engaging with an edge of sheets stacked in said bed, and at least one chocking element connected to one of said channels, said channels being arranged parallel with one another in an ordered graduated pattern for maximizing adjustability of said chocking element, said channels extending diagonally relative to said side walls.

15. A container for packaging graphical sheets, which comprises an enclosure having a base section and a cover section therefor, said base section comprising a bottom wall and opposing side walls extending upwardly from the peripheral edge of said bottom wall to provide a tray structure having an open bed for a stack of graphical sheets, said bottom wall having a plurality of adjacent channels for holding at least one chocking element for engaging with an edge of sheets stacked in said bed, and at least one chocking element connected to one of said channels, said channels being arranged in a graduated pattern for maximizing adjustability of said chocking element, said cover section comprising a top wall and opposing side walls extending downwardly from the peripheral edge of said top wall, said side walls corresponding substantially with the side walls of said base section to form an air, dust and light tight seal.

16. The graphical sheet packaging container of claim 15 wherein said base section comprises reinforced continuous inner and outer double side wall sections.

17. The graphical sheet packaging container of claim 16 wherein said reinforced side wall sections comprise a plurality of ridges and recesses.

18. The graphical sheet packaging container of claim 16 wherein the side walls of said cover and base sections are sufficiently tapered to permit nesting together of multiple base sections and multiple cover sections.

19. The graphical sheet packaging container of claim 18 which is refillable.

20. The packaging container of claim 18 filled with graphical sheets selected from the group consisting sheet film, photographic paper, photographic prints, photographic plates, graphic art plates and graphic art paper.

21. The packaging container of claim 15 filled with graphical sheets selected from the group consisting sheet film, photographic paper, photographic prints, photographic plates, graphic art plates and graphic art paper.

* * * * *